United States Patent [19]

Klingelhöfer

[11] Patent Number: 4,457,556
[45] Date of Patent: Jul. 3, 1984

[54] FITTING FOR ADJUSTABLY CONNECTING PARTS OF AUTOMOTIVE VEHICLE SEATS

[75] Inventor: Margret Klingelhöfer, Remscheid, Fed. Rep. of Germany

[73] Assignee: Keiper Automobiltechnik GmbH & Co. KG, Remschied-Hasten, Fed. Rep. of Germany

[21] Appl. No.: 187,972

[22] Filed: Sep. 16, 1980

Related U.S. Application Data

[63] Continuation of Ser. No. 774,938, Mar. 7, 1977, abandoned.

[30] Foreign Application Priority Data

Mar. 9, 1976 [DE] Fed. Rep. of Germany ....... 2609607

[51] Int. Cl.³ ............................................. A47C 1/025
[52] U.S. Cl. ..................................... 297/362; 16/354; 74/805
[58] Field of Search ........................ 297/361, 366–371, 297/373, 374, 355, 362; 74/804, 805; 16/341, 354

[56] References Cited

U.S. PATENT DOCUMENTS

| | | | |
|---|---|---|---|
| 2,933,986 | 4/1960 | Schroeder | 74/805 X |
| 3,045,503 | 7/1962 | Kiessling | 74/805 X |
| 3,401,979 | 9/1968 | Putsch | 297/362 |
| 3,423,785 | 1/1969 | Pickles | 297/374 |
| 3,667,804 | 6/1972 | Yasui et al. | 297/362 |
| 3,673,891 | 7/1972 | Pickles | 297/374 X |
| 3,833,965 | 9/1974 | Hess | 297/362 |
| 3,972,563 | 8/1976 | Gustafsson | 297/362 |

FOREIGN PATENT DOCUMENTS

| | | | |
|---|---|---|---|
| 1555711 | 10/1969 | Fed. Rep. of Germany | 297/362 |
| 2130873 | 1/1973 | Fed. Rep. of Germany | 297/362 |
| 2424042 | 1/1975 | Fed. Rep. of Germany | 74/805 |
| 1170708 | 11/1969 | United Kingdom | 297/362 |

Primary Examiner—William E. Lyddane
Attorney, Agent, or Firm—Michael J. Striker

[57] ABSTRACT

A fitting for adjustably connecting a backrest part to a seat part of a seat, particularly an automotive vehicle seat, includes a backrest mounting member and a seat mounting member which are respectively connectable to the backrest and seat parts of the seat. A ring gear is formed on the backrest mounting member and has a predetermined number of inwardly directed teeth centered relative to a ring-gear axis. A spur gear is located intermediate the backrest mounting member and the seat mounting member and has a number of outwardly directed teeth which is at least one less than the predetermined number of teeth on said ring gear. The outwardly directed teeth of the spur gear mesh with the inwardly directed teeth of the ring gear and are centered relative to a spur-gear axis. A cam radially offsets the spur-gear axis from the ring-gear axis, and a turning arrangement is operative for displacing the spur gear and for orbiting the spur-gear axis about the ring-gear axis so as to vary the relative angular position of the two mounting members. The backrest mounting member is mounted for pivoting movement about a pivot axis which is coincident with the ring-gear axis. The backrest mounting member is pivoted along a circular path having its center of curvature on this pivot axis during operation of the turning arrangement.

2 Claims, 7 Drawing Figures

FITTING FOR ADJUSTABLY CONNECTING PARTS OF AUTOMOTIVE VEHICLE SEATS

This is a continuation, of application Ser. No. 774,938, filed Mar. 7, 1977, now abandoned.

BACKGROUND OF THE INVENTION

The present invention relates generally to a hinge fitting for seats and, more particularly, to seats in which a backrest member is angularly adjustable with reference to a seat member. The invention is particularly but not exclusively suitable for use on seats of automotive vehicles.

It has been proposed in the prior art to connect a backrest mounting member and a seat mounting member respectively to a backrest part and a seat part of a seat. A ring gear having inwardly directed teeth is fixedly mounted on the seat mounting member, and a spur gear having outwardly directed teeth is fixedly mounted on the backrest mounting member and matingly engages the ring gear. The spur gear has an outer diameter smaller by the height of at least one tooth than the root diameter of the ring gear. The spur gear is mounted on a cam of a rotatable pin. A self-locking type of action between the spur gear and the ring gear is obtained by selecting the eccentric or radial offset distance of the cam to be approximately equal to the difference between the root diameter of the ring gear and the outer diameter of the spur gear.

However, this known proposal is disadvantageous in that the backrest mounting member does not move in a circular path of constant radius relative to the seat mounting member. The backrest mounting member is fixedly connected to the spur gear and, since the spur gear traverses an eccentric path of unequal radius, the backrest mounting member is forced to travel along such an eccentric path. This means that the angular speed of the backrest mounting member during its adjustment is non-uniform and, in fact, this angular speed varies in dependence upon the particular angular position of the spur gear relative to the ring gear.

Furthermore, it is frequently desirable to use spiral springs in order to hold the turning torque of the adjustment hand wheel used in rotating the cam to within acceptable limits, particularly when heavy back seat parts are to be adjusted. However, such springs cannot be satisfactorily used when the back seat mounting member moves through an eccentric path because the spring force varies due to the fact that the lever arm of the spring changes during such eccentric movement of the backrest mounting member.

In addition, such eccentric movement of the backrest mounting member means that the turning torque to the hand wheel also varies as a function of the particular angular position of the spur gear relative to the ring gear. This is extremely undesirable for a user since it makes simple adjustment of the seat very difficult.

A further disadvantage which results from the eccentric movement of the two mounting members is that the means for turning the rotatable pin on which the cam is mounted can be mounted only on the rotatable pin itself or else only on the stationary mounting member.

SUMMARY OF THE INVENTION

Accordingly, it is the general object of the present invention to overcome the disadvantages of the prior art.

An additional object of the present invention is to provide a simple construction for a fitting which comprises few component parts.

A further object of the present invention is to provide a fitting which provides for pivoting movement of a backrest mounting member relative to a seat mounting member along a circular path of constant radius.

In keeping with these objects and others which will become apparent hereinafter, one feature of the invention resides, briefly stated, in a fitting for adjustably connecting a backrest part to a seat part of a seat, particularly a seat of an automotive vehicle, which comprises a backrest mounting member connectable to the backrest part, and a seat mounting connectable to the seat part. A ring gear is provided on one of said members and has a predetermined number of inwardly directed teeth centered relative to a ring-gear axis. A spur gear is provided intermediate said one member and the other of said members and has a number of outwardly directed teeth which is at least one less than said predetermined number. The outwardly directed teeth of the spur gear mesh with the inwardly directed teeth of the ring gear and are centered relative to a spur-gear axis. Eccentric means, i.e. a cam, is provided for radially offsetting the spur-gear axis from the ring-gear axis. Turning means or a handle is operative for displacing the spur gear for orbiting the spur-gear axis about the ring-gear axis with the outwardly directed teeth meshing with the inwardly directed teeth so as to vary the relative angular position of the members by such displacement. The backrest mounting member and the seat mounting member are both mounted for movement about a pivot axis which is coincident with the ring-gear axis. The backrest mounting member is pivoted during operation of the turning means relative to the seat mounting member along a circular path of constant radius which has its center of curvature on the pivot axis.

The feature of mounting the backrest mounting member so that it traverses a circular path during operation of the turning means results in a uniform turning torque for the turning means, as well as a uniform angular speed for the backrest mounting member at any angular position of the spur gear relative to the ring gear. In addition, a spiral spring can now be utilized to facilitate adjustment of the seat. Also, motorized means can be connected to either mounting member to facilitate such adjustment. In accordance with the invention, it is only the spur gear which performs the eccentric movement. Neither mounting member is fixedly connected with the spur gear for participating in such movement.

In accordance with another feature of the invention, a self-locking type of action between the mounting members is obtained quite independently of the difference in the number of teeth, i.e. the mechanical advantage, provided on the ring gear and the spur gear. This locking action is obtained in a first embodiment by providing the seat mounting member with a ring gear having a number of inwardly directed teeth which is the same as the number of outwardly directed teeth on the spur gear. The spur gear thus meshes with the ring gear formed in the seat mounting member and, since the play between these gears is very small, a type of self-locking action results by frictional interengagement of the outwardly directed teeth of the spur gear with the inwardly directed teeth of the ring gear. Of course, the greater the number of teeth provided on both the spur gear and the ring gear of the seat mounting member, the greater will be the number of interengaging teeth for increasing the self-locking effect.

In another embodiment the self-locking action is obtained not only by frictional engagement between a ring gear of the backrest mounting member and the spur gear, but also by frictional engagement between wall portions bounding a plurality of holes formed in the spur gear and separate pins. Preferably, three holes are equidistantly and equiangularly spaced relative to each other so as to form a three-point support. A gear is mounted on each pin, and each of these gears meshes with another gear connected with the turning means. The number of teeth on these gears, i.e. the gear ratio, is selected to achieve a favorable mechanical advantage between the turning means and the spur gear.

In accordance with another embodiment the self-locking action is obtained by frictional engagement between wall portions bounding a plurality of holes formed in the spur gear and projections formed on the seat mounting member. These projections also provide overload protection. In the event of accident or whenever the backrest part is subjected to forces which tend to separate it from the seat part, the projections serve as additional supporting members which resist shearing forces and thereby prevent undesired destruction of the hinge fitting. The projections are not directly fixedly connected with the spur gear but a certain amount of free play exists between the projections and their respective holes. This free play serves as an additional safety factor in withstanding sudden forces.

As noted above, the invention allows a relief spring to be arranged between the seat mounting member and the pin to which the turning means is connected. The spring is operative for reducing the turning torque otherwise required for adjusting the backrest part. Since the spring always has a constant lever arm, it produces a constant biasing force at any selected position of the backrest mounting member relative to the seat mounting member.

The turning means may advantageously comprise a hand wheel connected to one end of a rotatable pin. The turning means may be mounted for rotation relative to either mounting member and may be connected with a pin by gears, chain links or like connecting members. The rotatable pin need not only be manually-operable, but can also be driven by a motor connected to either mounting member. In the event that two hinge fittings are used on opposite sides of a seat, the rotatable pins may be connected to each other for synchronous movement by either a rigid or flexible shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2:
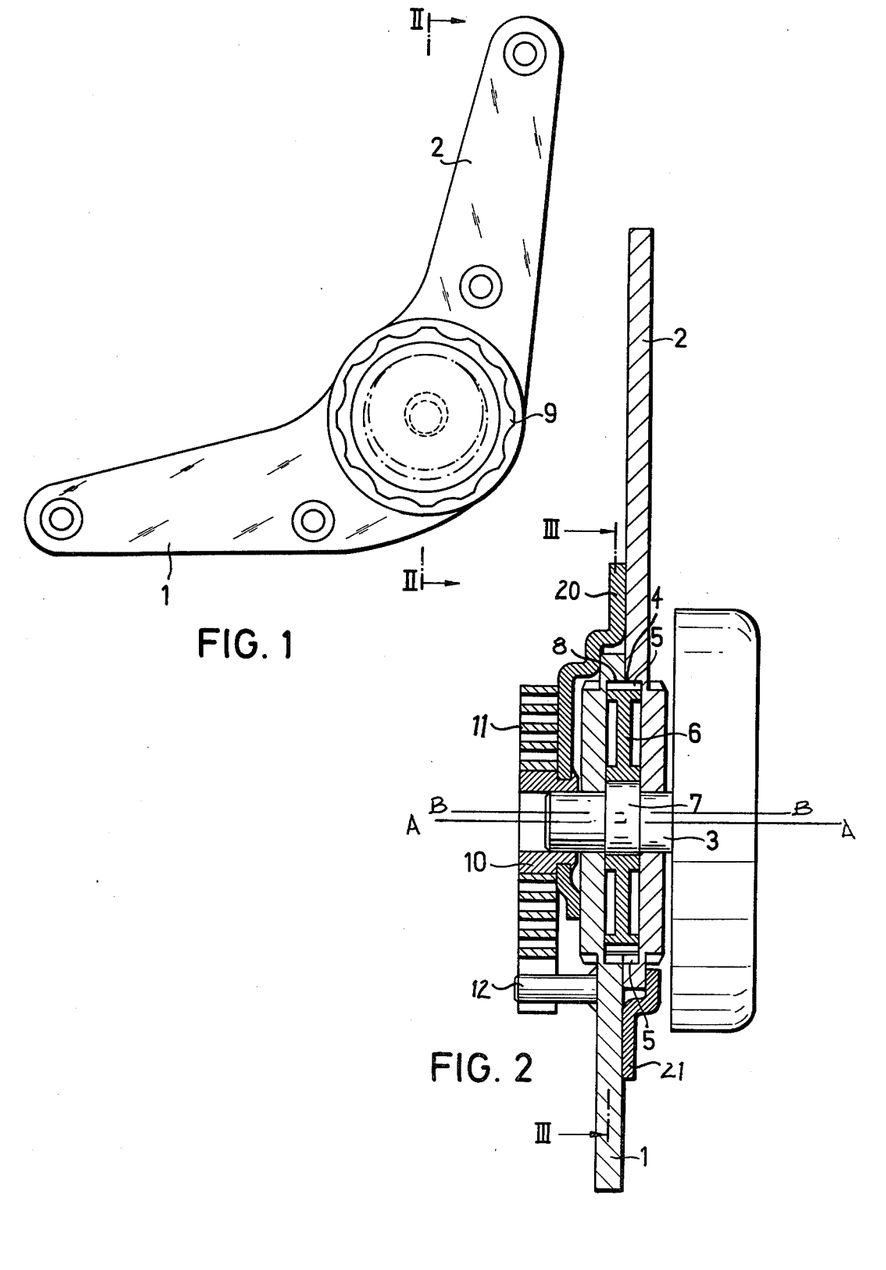
FIG. 1 is a side view of a fitting in accordance with the present invention.
FIG. 2 is a sectional view taken on line II—II of FIG. 1.

FIG. 1 illustrates a hinge fitting for an automotive vehicle having a seat comprised of a seat part and a tiltable backrest part. The hinge fitting according to the present invention comprises a stationary hinge part or seat mounting member 1 to be connected to the seat part of the seat, and a tiltable hinge part or backrest mounting member 2 to be connected to the backrest part of the seat. While the hinge fitting is, due to its compact construction, especially suitable for use in automotive vehicle seats, the disclosed hinge fitting can also be used in any other seat in which the backrest part is tiltably connected to the seat part. Generally, two such fittings are mounted at opposite sides of the seat, so that the inclination of the backrest part can be adjusted to suit the needs and/or comfort of a user of the seat. The two fittings may be connected with each other by a rigid or flexible connecting rod so that the hinge fittings may operate in synchronism. However, it is also possible to operate the hinge fittings separately or to provide a seat with only one or more than two hinge fittings. For the sake of convenience, the backrest part and the seat part of a seat with which the fitting is to be used have not been illustrated due to the fact that such an illustration is not believed to be necessary since there certainly can be no doubt as to what constitutes the seat part and the backrest part of a seat.

In the embodiment of FIG. 2, tiltable hinge part 2 has a ring gear 4 which has a predetermined number of inwardly directed teeth 5 centered relative to a ring-gear axis A—A. The hinge part 2 is formed with a recessed portion and the ring gear 4 is of one piece with the hinge part 2 at this recessed portion. However, it is also within the spirit of the invention to form the ring gear 4 as a separate member and thereupon to fixedly connect this separate ring gear with the hinge part 2, for example by riveting or the like.

A spur gear 6 is mounted intermediate tiltable hinge part 2 and stationary hinge part 1. The spur gear 6 has a number of outwardly directed teeth which mesh with the inwardly directed teeth 5 of ring gear 4 and which are centered about a spur-gear axis B—B. The number of outwardly directed teeth on spur gear 6 is different from the number of inwardly directed teeth 5 by at least one tooth or more. For example, in a preferred embodiment, if spur gear 6 has thirty teeth, then ring gear 4 may have thirty-one teeth.

Both hinge parts 1 and 2 are mounted on pin 3 for rotation about a pivot axis which is coincident with ring-gear axis A—A. Cylindrical pin 3 is rotatable about pivot or ring-gear axis A—A due to the fact that one end of the pin 3 is fixedly connected to a hand wheel or turning means 9. The other end of pin 3 is journalled in bearing member 10 on which biasing means or spiral spring 11 is mounted. The outer end of spring 11 is fixedly mounted to stationary hinge part 1 by means of bolt 12. The biasing means is operative for always urging the two hinge parts towards each other.

A cam 7 is mounted on rotatable pin 3 in eccentric relationship with axis A—A. The cam 7 has an outer cam surface which engages an interior passage of spur gear 6 so that the spur-gear axis B—B is radially offset from axis A—A. The outer diameter of spur gear 6 is smaller than the root diameter of ring gear 4 by at least the height of one tooth. Due to this difference in diameter and due to the difference in the number of teeth between ring and spur gears 4, 6, the hand wheel 9 is operative for turning pin 3 together with cam 7. This causes the spur gear 6 to be displaced, and the spur-gear axis B—B to be orbited about ring-gear axis A—A. At least one of the outwardly directed teeth of spur gear 6 meshes with at least one of the inwardly directed teeth 5 of ring gear 4 during operation of the turning means. In other words, the spur gear 6 will roll inside ring gear 4 and will become angularly offset relative to the ring gear by an angular distance equal to the difference in the number of teeth between the ring and spur gears. In the example given above, each time the hand wheel 9 performs a complete revolution, the spur-gear axis B—B completely orbits about the ring-gear axis A—A, and the spur gear is angularly offset by an angular distance equal to one tooth.

Figure 3:
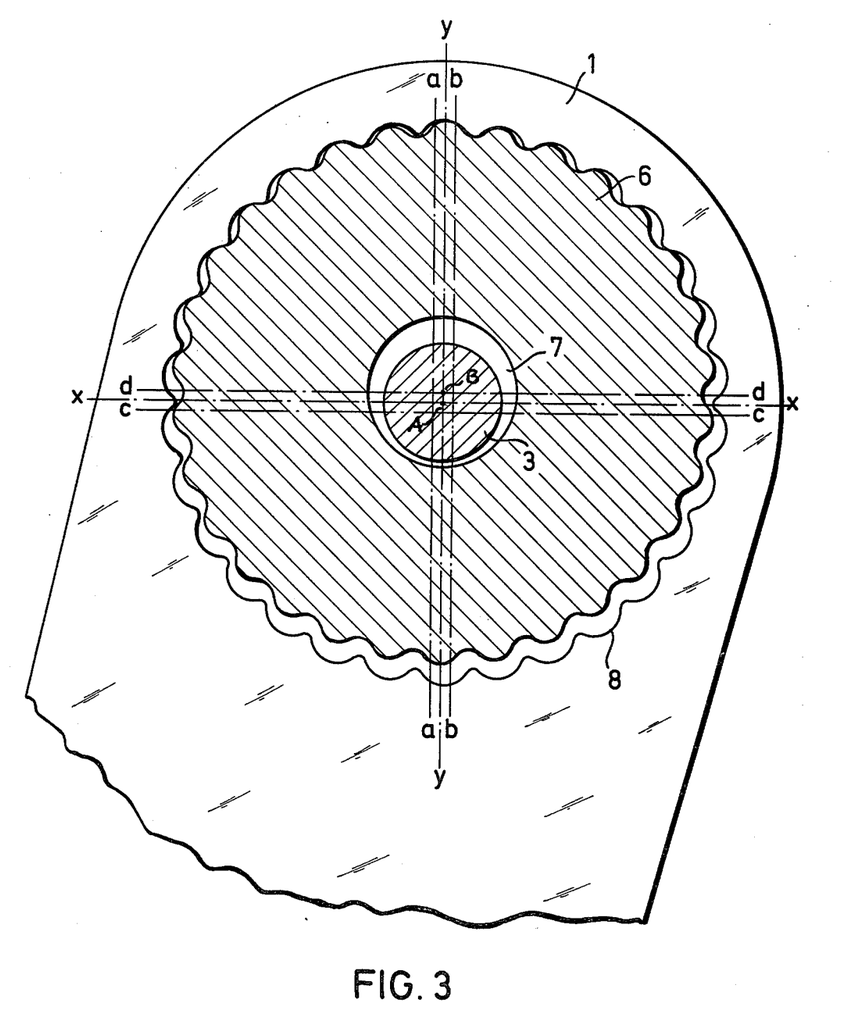
FIG. 3 is a sectional view taken on line III—III of FIG. 2.

As diagrammatically shown in FIG. 3, the y and x coordinate axes of spur gear 6 are respectively displaced between end positions a,b and c,d. That is, the x and y coordinate axes are moved through a distance which is twice the radial offset distance, as measured between axis A—A and axis B—B.

The ring gear 4 and its associated hinge part 2 are thus moved together by an angular distance of one tooth. The backrest part moves together with the hinge part 2.

The hinge part 1 is also formed with a recessed portion wherein a ring gear 8 is located. Ring gear 8 has a number of inwardly directed teeth which is the same as the number of outwardly directed teeth on spur gear 6 (e.g. thirty teeth as in the previous example). The teeth of ring gear 8 are centered about axis A—A and also mesh with the teeth of spur gear 6. As shown in FIG. 3, since spur gear 6 and ring gear 8 have the same number of teeth, these gears have a self-locking action which prevents a once-selected setting from changing unintentionally due to frictional interengagement between respective ones of the respective sets of teeth. In this manner, the backrest part is adjusted to any selected angular position relative to the seat part FIGS. 4 and 5 show another embodiment of the invention with like reference numerals identifying like parts.

Some differences between this embodiment and the one previously described reside in the fact that a cam is not mounted directly on the rotatable pin 3, and also in that the stationary hinge part 1 does not have a ring gear.

The spur gear 6 has wall portions bounding at least two, but preferably a greater number, of equal diameter circular holes 13 which are equidistantly and equiangularly spaced in circumferential direction relative to axis A—A. A plurality of separate auxiliary pins 14 are respectively provided at one end thereof with cams 15. Each cam has an outer cam surface which is in motion-transmitting engagement with a respective hole 13. Gears 16 are mounted at the other ends of pins 14 for turning the latter. The outer teeth of gear 16 matingly engage the outer teeth of gear 17 which is mounted on the rotatable pin 3. Gears 16 and 17 constitute coupling means intermediate the handle 9 and the respective pins 14.

Figure 4:
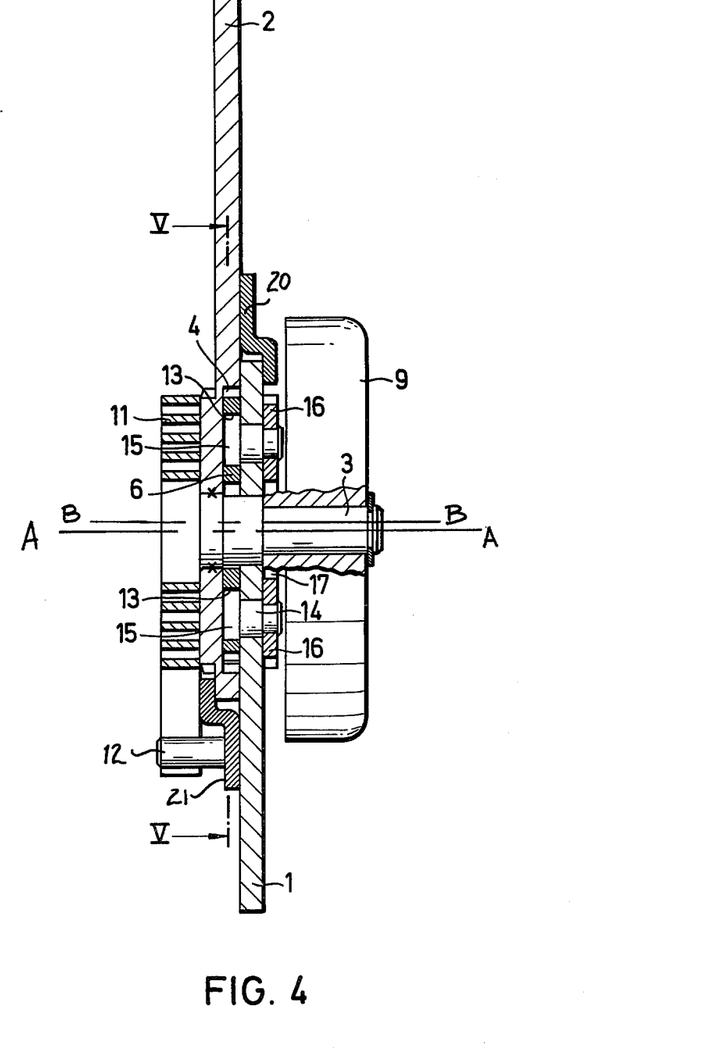
FIG. 4 is a sectional view analogous to FIG. 2 of another embodiment in accordance with the present invention.
Figure 5:
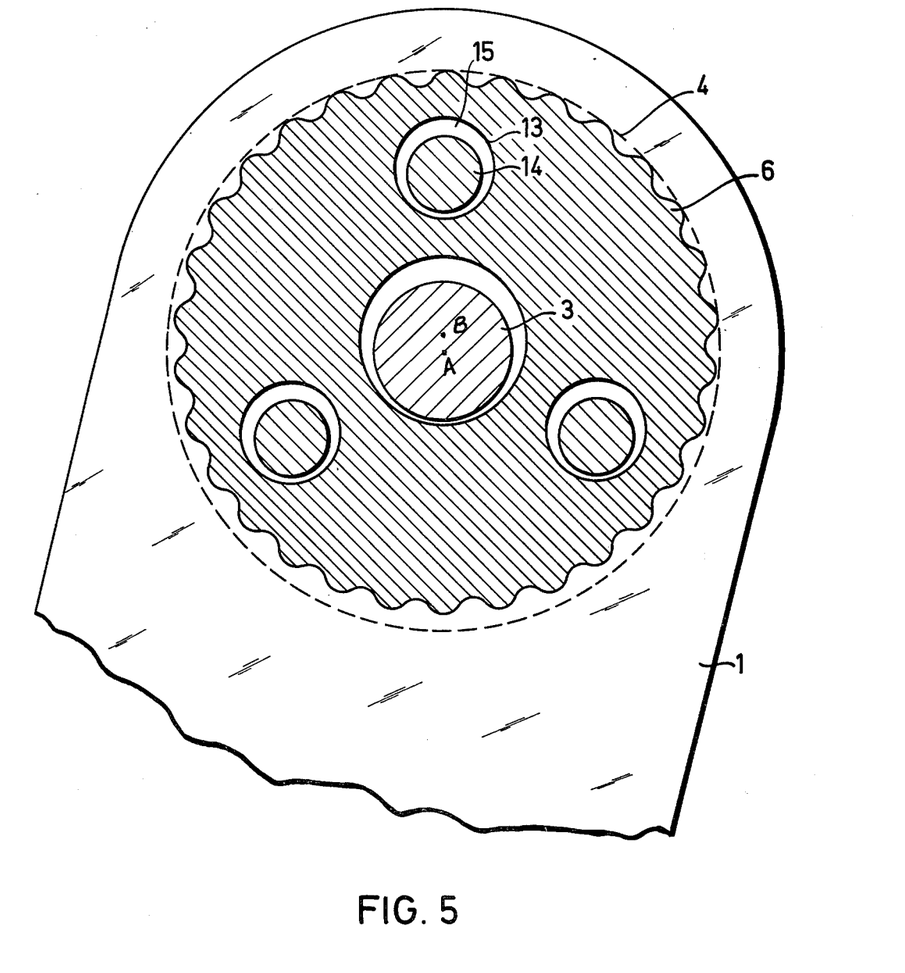
FIG. 5 is a sectional view taken on line V—V of the embodiment of FIG. 4.

As shown in FIG. 4, hinge part 2 is mounted on pin 3 for pivoting movement about pivot axis A—A which it will be recalled is the same axis on which the teeth of ring gear 4 is centered. The cams 15 serve to offset the spur-gear axis B—B in radial direction from axis A—A.

In operation, the handle 9 is rotated, and the pin 3 turns about axis A—A. Gear 17 rotates with pin 3 and in turn causes gears 16 to rotate about the respective axes of elongation of the respective pins 14. The pins 14 together with cams 15 are thereby turned, and the spur gear 6 is displaced relative to stationary hinge part 1 and spur gear 6 rolls within the ring gear 4. As before the spur-gear axis B—B orbits about pivot axis A—A.

Self-locking action is obtained by frictional interengagement between the inwardly-directed teeth of ring gear 4 of hinge part 2 and the outwardly directed teeth of spur gear 6, as well as by frictional interengagement between hinge part 1 and the pins 14.

Figure 6:
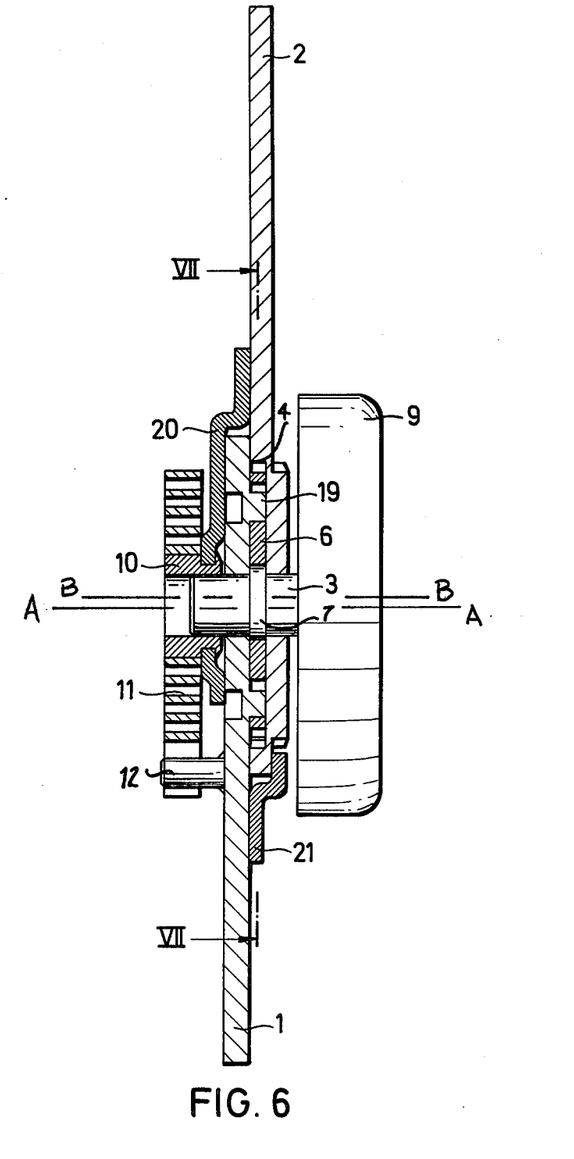
FIG. 6 is a sectional view analogous to FIGS. 2 and 4 showing still another embodiment according to the present invention.
Figure 7:
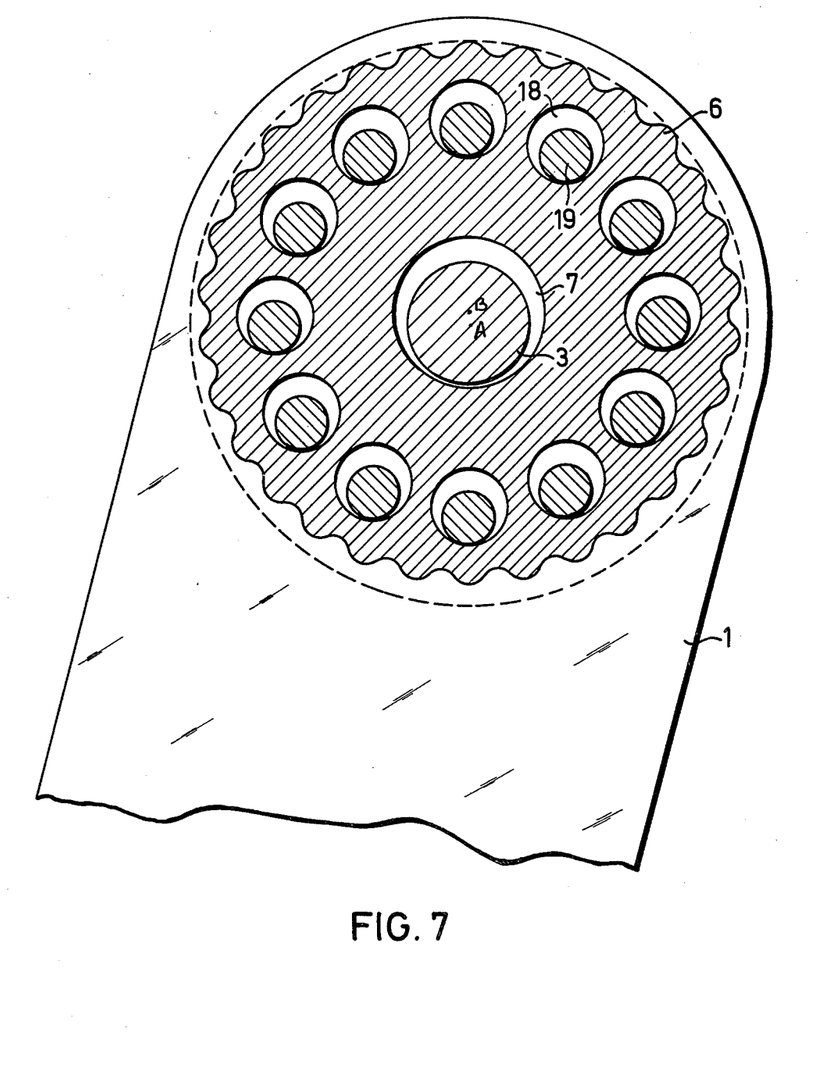
FIG. 7 is a sectional view taken on line VII—VII of the embodiment of FIG. 6.

FIGS. 6 and 7 show another embodiment of the invention with like reference numerals identifying similar parts. This embodiment is similar to the embodiment of FIG. 2 in that the cam 7 is directly mounted on rotatable pin 3, and is also similar to the embodiment of FIG. 4 in that no ring gear is provided on stationary hinge part 1 and further in that the spur gear 6 has wall portions bounding at least two, and preferably a greater number (e.g. twelve in the illustrated embodiment) of, equal diameter circular holes 18 which are equidistantly spaced and equiangularly arranged in circumferential direction relative to pivot axis A—A. However, instead of separate pins, the stationary hinge part 1 itself is formed with cylindrical projections 19 which extend through a respective hole 18. The diameter of each projection 19 is smaller than the diameter of a respective hole 18 by twice the radial offset distance between axis A—A and axis B—B. Self-locking action is obtained by frictional interengagement between the inwardly directed teeth of ring gear 4 of hinge part 2 and the outwardly directed teeth of spur gear 6, as well as by frictional interengagement between the projections 19 of hinge part 1 and parts of the inner circumferential wall portions bounding the respective holes 18 of spur gear 6.

The operation of this embodiment is substantially as described above. The spur-gear axis B—B orbits about pivot axis A—A due to rotation of the cam 7, pin 3 and handle 9. Spur gear 6 shifts about the respective axes of elongation of the projections 19, and spur gear 6 rolls within ring gear 4 and is moreover angularly displaced by the difference in the number of teeth between ring gear 4 and spur gear 6 for each revolution of handle 9.

In all of the illustrated embodiments, holding clamps 20 and 21 are provided to hold and support the hinge parts 1 and 2 at any selected relative angular position. Respective ends of clamps 20 and 21 are fixedly mounted to hinge parts 1 and 2, respectively. The other ends of clamps 20 and 21 overlap and tightly frictionally engage respective ends of hinge parts 2 and 1, respectively. The entire hinge fitting thus forms a portable, complete unit whose components parts do not accidentally disassemble during use.

It will be understood that each of the elements described above, or two or more together, may also find a useful application in other types of constructions differing from the types described above.

While the invention has been illustrated and described as embodied in fittings for adjustably connecting backrest parts and seat parts of automotive vehicle seats, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fitting for adjustably connecting a backrest part to a seat part of a seat, particularly a seat of an automotive vehicle, comprising: a backrest mounting member connectable to the part; a ring gear having an axis and being arranged on one of said members, said ring gear having a predetermined number of inwardly directed teeth centered relative to the ring gear axis; a spur gear having a further axis and being arranged intermediate the one and the other of said members, the spur gear having a number of outwardly directed teeth, which is at least one less than the predetermined number of teeth on the ring gear, said outwardly directed teeth of said spur gear being in meshing engagement with said inwardly directed teeth and being centered relative to the further axis; eccentric means for radially offsetting said further axis from said ring gear axis and including auxiliary pins mounted circumferentially about the pivot axis, each of the pins extending through one of said members and having one end, a cam mounted to the one end of the associated pin and being in motion-transmitting engagement with said spur gear; turning means for displacing said spur gear for orbiting said further axis about said ring gear axis with said outwardly directed teeth meshing with said inwardly directed teeth and including a rotatable pin, extending through said members, said members being mounted at spaced locations lengthwise of said pin; coupling means intermediate said turning means and said auxiliary pins for rotating the latter with said cams and for displacing said spur gear; and means for mounting said members for movement about the pivot axis so that upon operation of the turning means said one member is displaced relative to the other member along a circular path having its center of curvature on the pivot axis for providing the relative angular position of said members.

2. The fitting as defined in claim 1, wherein said coupling means comprises a first gear mounted on said rotatable pin for rotation therewith, and a plurality of second gears each being mounted for rotation with a respective auxiliary pin and each second gear meshing with said first gear.

* * * * *